US012601366B2

(12) United States Patent
Haylock et al.

(10) Patent No.: US 12,601,366 B2
(45) Date of Patent: Apr. 14, 2026

(54) FLUID TIGHT BLIND FASTENERS AND METHODS FOR FASTENING

(71) Applicant: HOWMET AEROSPACE INC., Pittsburgh, PA (US)

(72) Inventors: Luke L. Haylock, Culver City, CA (US); Todd A. Balls, Tucson, AZ (US); Junjie Huang, San Gabriel, CA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 174 days.

(21) Appl. No.: 18/000,143

(22) PCT Filed: Jun. 16, 2021

(86) PCT No.: PCT/US2021/037614
§ 371 (c)(1),
(2) Date: Nov. 29, 2022

(87) PCT Pub. No.: WO2021/257694
PCT Pub. Date: Dec. 23, 2021

(65) Prior Publication Data
US 2023/0243379 A1 Aug. 3, 2023

Related U.S. Application Data

(60) Provisional application No. 63/039,772, filed on Jun. 16, 2020.

(51) Int. Cl.
F16B 19/10 (2006.01)
F16B 5/04 (2006.01)
(52) U.S. Cl.
CPC ............ F16B 19/1072 (2013.01); F16B 5/04 (2013.01)

(58) Field of Classification Search
CPC ... F16B 19/1072; F16B 37/067; F16B 13/061
(Continued)

(56) References Cited

U.S. PATENT DOCUMENTS 2,392,133 A * 1/1946 Eklund ................. F16B 37/067
470/209
2,887,926 A * 5/1959 Edwards ............... F16B 13/061
411/38
(Continued)

FOREIGN PATENT DOCUMENTS

CA 2603635 A1 3/2008
CN 103090764 A 5/2013
(Continued)

OTHER PUBLICATIONS

International Search Report and Written Opinion of the International Searching Authority for International Application No. PCT/US2021/037614 mailed Oct. 6, 2021.

*Primary Examiner* — Flemming Saether
(74) *Attorney, Agent, or Firm* — K&L Gates LLP

(57) ABSTRACT

Fluid tight blind fasteners and methods tor fastening are provided. The sleeve comprises a first sleeve end comprising a first inner surface, a second sleeve end comprising a second inner surface, and an elongate portion extending from the first sleeve end to the second sleeve end. The first inner surface and the second inner surface define a sleeve cavity extending into the sleeve from the first sleeve end toward or to the second sleeve end. The pin is configured to be at least partially received by the sleeve cavity. The pin comprises a first pin end portion configured to receive a torque, a second pin end, and a shank extending from the first pin end portion to the second pin end. Tire shank comprises threads and the threads are configured to form threads on the second inner surface of the sleeve.

18 Claims, 11 Drawing Sheets

(58) Field of Classification Search
USPC ...................................................... 411/34–38
See application file for complete search history.

(56) References Cited

U.S. PATENT DOCUMENTS

| | | | | | |
|---|---|---|---|---|---|
| 2,918,841 | A | * | 12/1959 | Ougljesa | F16B 13/061 |
| | | | | | 411/36 |
| 3,838,588 | A | * | 10/1974 | Johnson | B25B 27/0014 |
| | | | | | 72/114 |
| 3,916,970 | A | * | 11/1975 | Owens | B60C 15/0226 |
| | | | | | 152/399 |
| 4,776,737 | A | * | 10/1988 | Wollar | F16B 35/044 |
| | | | | | 411/908 |
| 5,403,135 | A | * | 4/1995 | Renner | B25B 27/0007 |
| | | | | | 470/29 |
| 6,247,883 | B1 | | 6/2001 | Monserratt | |
| 6,868,757 | B2 | | 3/2005 | Hufnagl et al. | |
| 7,033,120 | B2 | | 4/2006 | Hufnagl et al. | |
| 8,777,533 | B2 | | 7/2014 | Hufnagl et al. | |
| 8,936,422 | B2 | * | 1/2015 | Makino | F16B 37/067 |
| | | | | | 411/34 |
| 8,979,553 | B2 | | 3/2015 | Lloyd et al. | |
| 9,669,457 | B2 | | 6/2017 | Bigot et al. | |
| 10,006,478 | B2 | | 6/2018 | Hufnagl et al. | |

| | | | |
|---|---|---|---|
| 2005/0123373 | A1 | 6/2005 | Hufnagl et al. |
| 2006/0002784 | A1 | 1/2006 | Curtis |
| 2008/0206011 | A1 | 8/2008 | Wille |
| 2011/0058916 | A1 | 3/2011 | Toosky |
| 2017/0122359 | A1 | 5/2017 | Foerster, Jr. |
| 2018/0238374 | A1 | 8/2018 | Gris et al. |
| 2019/0186522 | A1 | 6/2019 | Pailhories et al. |

FOREIGN PATENT DOCUMENTS

| | | |
|---|---|---|
| CN | 105822641 A | 8/2016 |
| CN | 108612726 A | 10/2018 |
| CN | 208089719 U | 11/2018 |
| CN | 109899369 A | 6/2019 |
| EP | 1279839 A2 | 1/2003 |
| EP | 3045740 A1 | 7/2016 |
| EP | 3556845 A1 | 10/2019 |
| EP | 3556875 A1 | 10/2019 |
| JP | 6-74220 A | 3/1994 |
| JP | 2007-64412 A | 3/2007 |
| JP | 2007-170645 A | 7/2007 |
| TW | 534133 U | 5/2003 |
| WO | 2004/108325 A1 | 12/2004 |
| WO | 2016118694 A1 | 7/2016 |
| WO | 2018017810 A1 | 1/2018 |

* cited by examiner

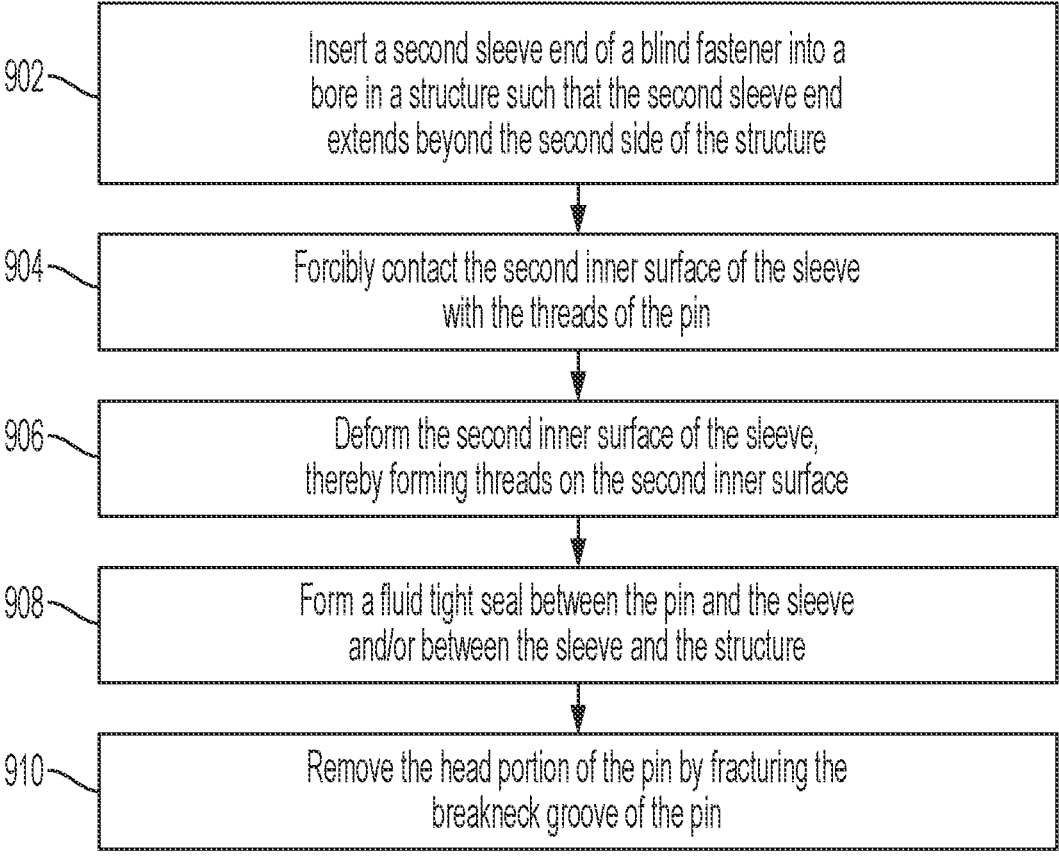

902 — Insert a second sleeve end of a blind fastener into a
bore in a structure such that the second sleeve end
extends beyond the second side of the structure 904 — Forcibly contact the second inner surface of the sleeve
with the threads of the pin 906 — Deform the second inner surface of the sleeve,
thereby forming threads on the second inner surface 908 — Form a fluid tight seal between the pin and the sleeve
and/or between the sleeve and the structure 910 — Remove the head portion of the pin by fracturing the
breakneck groove of the pin

FIG. 9

FLUID TIGHT BLIND FASTENERS AND METHODS FOR FASTENING

CROSS-REFERENCE TO RELATED APPLICATION

This application claims the benefit of U.S. Provisional Application Ser. No. 63/039,772 filed Jun. 16, 2020, entitled "FLUID TIGHT BLIND FASTENERS AND METHODS FOR FASTENING," the contents of which is hereby incorporated by reference in its entirety herein.

FIELD OF USE

The present disclosure relates to blind fasteners and methods of fastening using a blind fastener. More particularly, the present disclosure relates to fluid tight blind fasteners and related installation methods.

BACKGROUND

Large fluid tight structures such as, for example, aircraft fuselages and storage tanks, can be assembled in a process that involves workers cooperating from both sides of the structure to install two-component mechanical fasteners such as a nut and a bolt. Assembling such structures can be problematic when physical and/or visual access to one side of the structure is limited.

Typical blind fasteners such as, for example, blind rivets or blind bolts, are operable from one side of a structure but may not provide controlled clamping force and/or an effective seal against leaking of fluids. The use of a supplemental sealant or separate deformable sealing component can add to the cost and complexity of installation of the typical blind fastener. An example of a blind fastener is described in U.S. Pat. No. 10,006,478. Other fasteners are described in, for example, U.S. Pat. Nos. 7,033,120, 6,868,757, 8,777,533, 8,979,553, and 9,669,457. Designing a tight blind fastener that imparts a desired clamping force, is fluid tight after installation, and is cost-effective to manufacture can present challenges.

SUMMARY

One non-limiting aspect according to the present disclosure provides a blind fastener comprising a sleeve and a pin. The sleeve comprises a first sleeve end comprising a first inner surface, a second sleeve end comprising a second inner surface, and an elongate portion extending from the first sleeve end to the second sleeve end. The first inner surface and the second inner surface define regions of a sleeve cavity extending into the sleeve from the first sleeve end toward or to the second sleeve end. The pin is configured to be at least partially received by the sleeve cavity. The pin comprises a first pin end portion configured to receive a torque, a second pin end, and a shank extending from the first pin end portion to the second pin end. The shank comprises threads, and the threads are configured to form threads on the second inner surface of the sleeve.

Another non-limiting aspect according to the present disclosure provides a method for fastening. The method comprises inserting a second sleeve end of a sleeve of a blind fastener into a bore in a structure. The blind fastener comprises the sleeve and a pin. The sleeve comprises a first sleeve end comprising a first inner surface, the second sleeve end comprising a second inner surface, and elongate portion extending from the first sleeve end to the second sleeve end.

The first inner surface and the second inner surface define regions of a sleeve cavity extending into the sleeve from the first sleeve end toward or to the second sleeve end. The pin is configured to be at least partially received by the sleeve cavity. The pin comprises a first pin end portion, a second pin end, and a shank extending from the first pin end portion to the second pin end, and the shank comprises threads. The method comprises disposing a portion of the pin in the sleeve and forcibly contacting the threads of the shank of the pin with the second inner surface of the sleeve, thereby deforming the second inner surface and forming threads thereon.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein:

FIG. 9 is a flow chart illustrating a non-limiting embodiment of a method for fastening according to the present disclosure:

Corresponding reference characters indicate corresponding parts throughout the several views. The exemplifications set out herein illustrate certain non-limiting embodiments, in one form, and such exemplifications are not to be construed as limiting the scope of the appended claims in any manner.

DETAILED DESCRIPTION OF NON-LIMITING EMBODIMENTS

Various examples are described and illustrated herein to provide an overall understanding of the structure, function, and use of the disclosed apparatus and methods. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of the present disclosure. As such, the claims may be amended to recite any features or characteristics expressly or inherently described in, or otherwise expressly or inherently supported by, the present disclosure. Further, Applicant reserves the right to amend the claims to affirmatively disclaim features or characteristics that may be present in the prior art. The various non-limiting embodiments disclosed and described in the present disclosure can comprise, consist of, or consist essentially of the features and characteristics as variously described herein.

Any references herein to "various embodiments," "some embodiments," "one embodiment," "an embodiment," "a non-limiting embodiment," or like phrases mean that a particular feature, structure, or characteristic described in connection with the example is included in at least one embodiment. Thus, appearances of the phrases "in various embodiments," "in some embodiments," "in one embodiment," "in an embodiment," "in a non-limiting embodiment," or like phrases in the specification do not necessarily refer to the same non-limiting embodiment. Furthermore, the particular described features, structures, or characteristics may be combined in any suitable manner in one or more non-limiting embodiments. Thus, the particular features, structures, or characteristics illustrated or described in connection with one non-limiting embodiment may be combined, in whole or in part, with the features, structures, or characteristics of one or more other non-limiting embodiments without limitation. Such modifications and variations are intended to be included within the scope of the present non-limiting embodiments.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Figure 1:
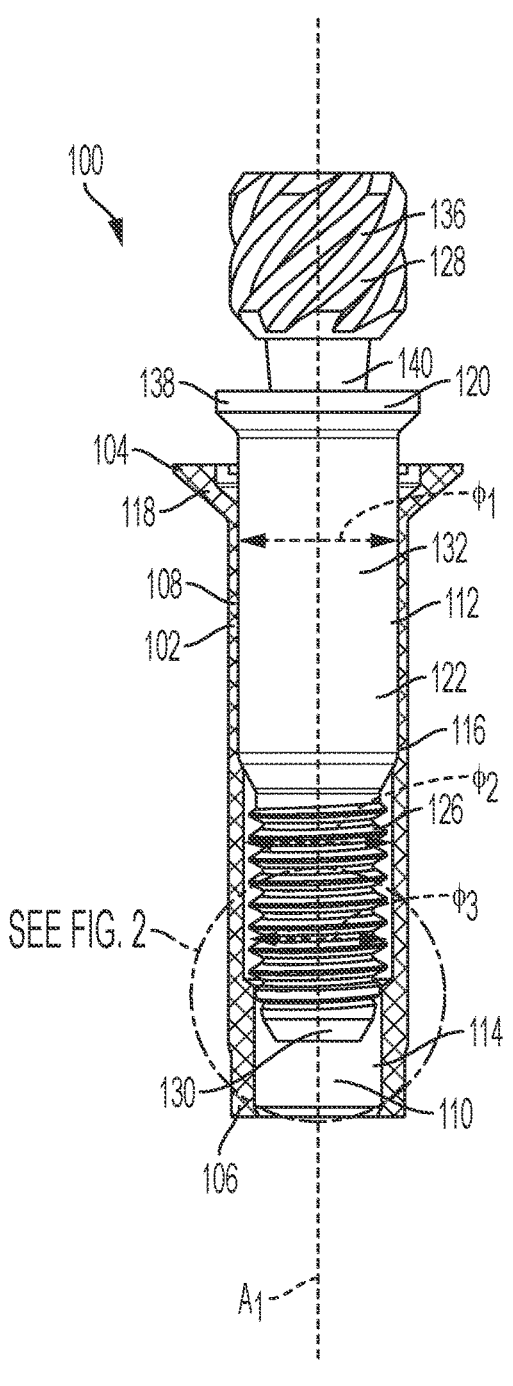
FIG. 1 is a partial cross-sectional elevational view of a non-limiting embodiment of a blind fastener according to the present disclosure, shown prior to forming threads on a second inner surface of a sleeve.

Embodiments of the blind fastener according to the present disclosure can impart a desired clamping force, can be fluid tight after installation, and can be cost-effective to manufacture. For example, FIG. 1 illustrates a non-limiting embodiment of a blind fastener 100 according to the present disclosure. The blind fastener 100 can be configured to be installed in a bore in a structure (for example, a structure as shown and described with respect to FIGS. 3 and 5). The blind fastener 100 can include at least two components, for example, a sleeve 102 and a pin 120, as illustrated in FIG. 1. In other non-limiting embodiments (not shown), a blind fastener according to the present disclosure can comprise three or more components. In various non-limiting embodiments, the blind fastener 100 can consist of a two-piece assembly including, for example, the sleeve 102 and the pin 120. In certain non-limiting embodiments, the blind fastener 100 can be a structural blind fastener, such as, for example, a structural blind rivet, a structural blind bolt, or a structural blind stud.

Again referring to FIG. 1, the sleeve 102 of the blind fastener 100 can comprise a first sleeve end 104, a second sleeve end 106, and an elongate portion 108 intermediate the first sleeve end 104 and the second sleeve end 106. The elongate portion 108 can define a longitudinal axis, $A_1$, of the sleeve 102 and/or the blind fastener 100. The sleeve 102 can be sized and configured such that the second sleeve end 106 extends beyond the structure into which the blind fastener 100 is installed when the blind fastener 100 is installed in the structure.

Figure 7:
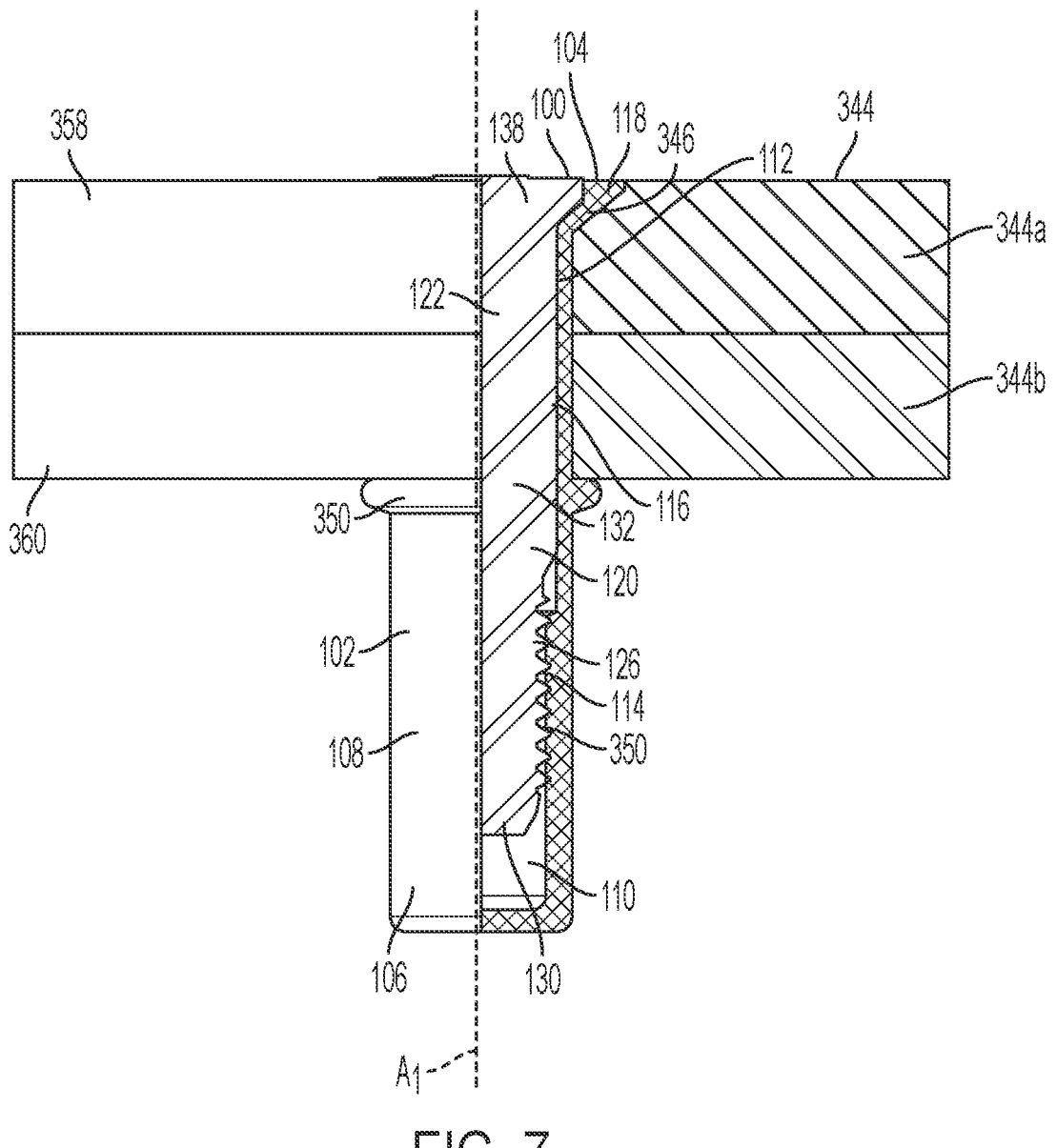
FIG. 7 is a partial cross-sectional elevational view of a non-limiting embodiment of a blind fastener according to the present disclosure with a sleeve cavity that does not extend completely through the second sleeve end, shown installed in a structure with threads formed on the second inner surface of the sleeve and a bulb formed on the elongate portion of the sleeve.

The first sleeve end 104 comprises a first inner surface 112, and the second sleeve end 106 comprises a second inner surface 114. In certain non-limiting embodiments, a third inner surface 116 is intermediate the first inner surface 112 and the second inner surface 114. The first inner surface 112, the second inner surface 114, and, if present, the third inner surface 116 can define a sleeve cavity 110 that extends through the elongate portion 108, from the first sleeve end 104 to the second sleeve end 106. The sleeve cavity 110 may extend completely through the sleeve 102 as shown in FIG. 1, or, as shown in FIG. 7, the second sleeve end 106 may be closed so that the sleeve cavity 110 does not extend completely through the sleeve 102.

In various non-limiting embodiments, the first sleeve end 104 can comprise a flange portion 118 configured to inhibit the sleeve 102 from traversing through a bore in a structure (for example, as described with respect to FIGS. 3 and 5 herein) beyond a predetermined distance. Depending on the particular application of the blind fastener 100, the flange portion 118 can be configured to be flush with a surface of a structure, or the flange portion 118 can protrude from the surface of the structure. In various embodiments, the flange portion 118 can comprise an internal smooth bore to accommodate a flange portion 138 of the pin 120. In various non-limiting embodiments, the flange portion 118 of the sleeve 102 can have an internal countersink, and the flange portion 138 of the pin 120 can comprise a generally conical shape complimentary to the internal countersink in the flange portion 118.

Figure 10:
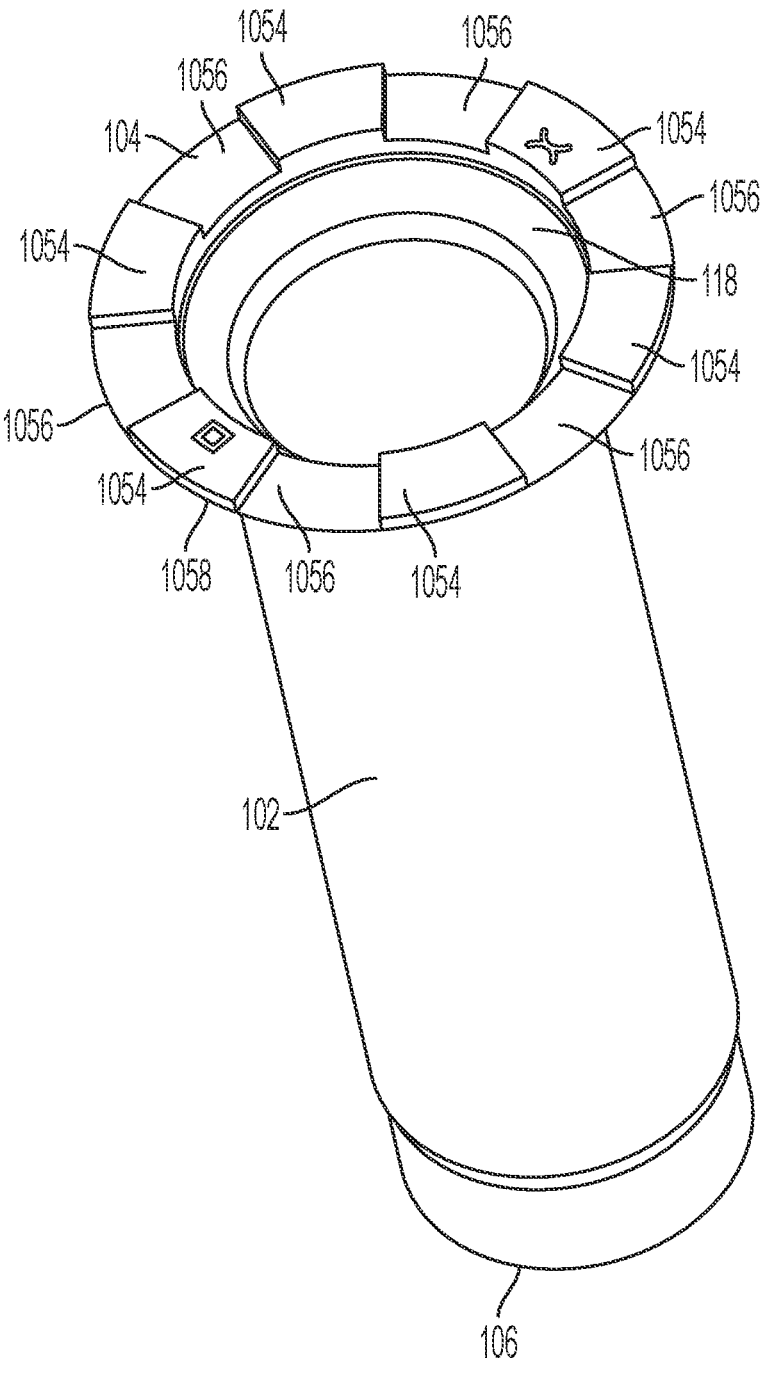
FIG. 10 is perspective view of a non-limiting embodiment of a sleeve of a blind fastener according to the present disclosure, shown with tabs.
Figure 11:
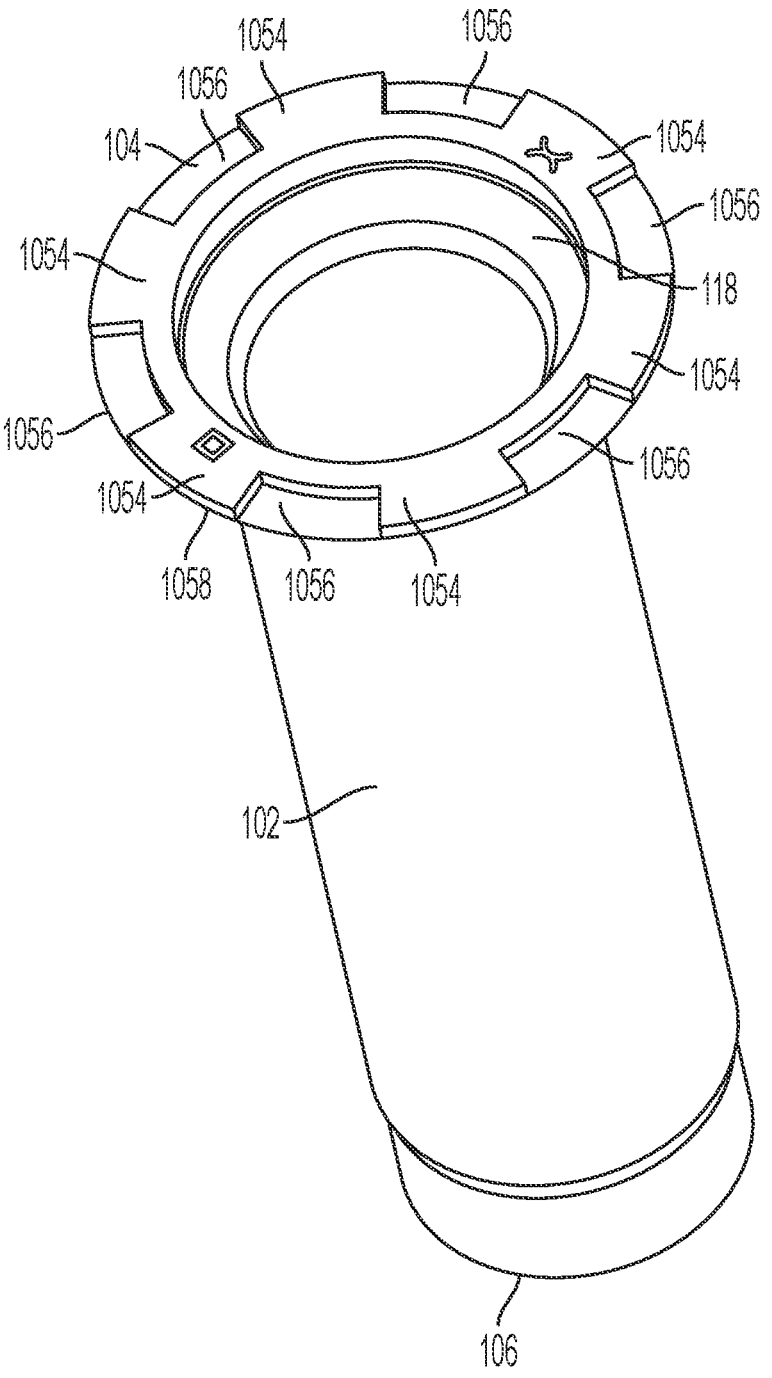
FIG. 11 is perspective view of a non-limiting embodiment of a sleeve of a blind fastener according to the present disclosure, shown with tabs.

In certain embodiments, the first sleeve end 104 can be configured to receive a torque such that the sleeve 102 can be gripped to rotate and/or prevent rotation about the longitudinal axis, $A_1$, by forcibly contacting the first sleeve end 104. For example, the first sleeve end 104 can comprise at least one of a substantially flat side, a rib, a spline, an indent, a knurl, a lobe, a bore, a recessed socket, a tab, or a similar structural feature. In certain non-limiting embodiments, as illustrated in FIGS. 10 and 11, the first sleeve end 104 of the sleeve 102 can comprise tabs 1054. In various non-limiting embodiments, the sleeve 102 can be inhibited from rotation by application of an axial force to the sleeve 102, thereby generating a frictional force between the sleeve 102 and a structure into which the sleeve is installed. In certain non-limiting embodiments, as illustrated in FIGS. 10 and 11, the sleeve 102 can be configured with a plurality of internal recesses 1056 to react to the torque, and each recess 1056 can be rearward sloping and disposed in a generally circular orientation on an exterior surface 1058 of the flange portion 118 of the sleeve 102 such that the recesses can engage the structure during installation to inhibit rotation of the sleeve 102.

Again referring to FIG. 1, in various non-limiting embodiments, the pin 120 of the blind fastener 100 can comprise a first pin end portion 128, a second pin end 130, and a shank 122, which can be configured to be complementary to the sleeve 102. The pin 120, including the shank 122, can comprise a shape suitable to be at least partially received within the sleeve cavity 110 of the sleeve 102. In various non-limiting embodiments, the shank 122 has a generally cylindrical shape. The shank 122 can be intermediate the first pin end portion 128 and the second pin end 130 and can be dimensioned so that it can be inserted into and extend at least partially through the sleeve cavity 110. When the shank 122 is inserted in the sleeve cavity 110, the first pin end portion 128 can be disposed adjacent to the first sleeve end 104, and the second pin end 130 can be disposed adjacent to the second sleeve end 106.

In various non-limiting embodiments, the first pin end portion 128 can be configured to receive a torque. For example, the first pin end portion 128 can comprise a head portion 136 configured to receive a torque such that the pin 120 can be rotated about the longitudinal axis, $A_1$, by forcibly contacting the head portion 136 and applying a rotational force to the pin 120. In various non-limiting embodiments, the head portion 136 can comprise at least one of a substantially flat side, a rib, a spline, an indent, a knurl, a lobe, a bore, a recessed socket, a tab, and a similar structural feature. For example, the head portion 136 can comprise one of a square head portion, a hex head portion, a knurled head portion, a splined head portion, and a recessed socket head portion. As illustrated in FIG. 1, the head portion 136 is a splined head portion. In various non-limiting embodiments, a suitable blind fastener installation tool can be used to engage the head portion 136 and apply a rotational (e.g., torsional) force to the pin 120 while simultaneously applying an axial force (e.g., normal force) to maintain engagement with the sleeve 102. The blind fastener installation tool can be configured to hold the sleeve 102 stationary during rotation of the pin 120. In various non-limiting embodiments, the blind fastener installation tool can be configured to forcefully contact and deform the generally smooth upper surface of the sleeve 102 to form a recess simultaneous with the installation process such that the blind fastener installation tool inhibits rotation of the sleeve 102 by forcibly contacting the recess formed in the sleeve 102.

In various non-limiting embodiments, as shown in FIG. 1, the first pin end portion 128 can comprise a flange portion 138 and a breakneck groove 140 intermediate the head portion 136 and the flange portion 138. The flange portion 138 can be configured to inhibit traversal of the pin 120 into the sleeve cavity 110 beyond a predetermined distance. The breakneck groove 140 can be configured to fracture responsive to a torsional shear force applied to the head portion 136.

The shank 122 comprises threads 126 and, in various non-limiting embodiments, optionally further comprises a first shank region 132, as further discussed below. In various non-limiting embodiments, the first shank region 132 can be intermediate the threads 126 and the first pin end portion 128. In certain non-limiting embodiments, the first shank region 132 can comprise a substantially cylindrical shape. The threads 126 can be right handed threads or left handed threads. The threads 126 can be, for example, square threads, trapezoidal threads, buttress threads, another thread type, or a combination of thread types. In various non-limiting embodiments, the threads 126 can be thread-forming threads, such as, for example, threads of TAPTITE® fasteners (available from REMINC, Middletown, RI), or other thread forming thread types. The thread forming threads can engage the second inner surface 114 of the sleeve 102 and form threads thereon. The threads 126 can receive a suitable forming torque with respect to a thread stripping torque to form threads on the second inner surface 114 with minimal, if any, expansion of the sleeve 102, thereby creating a fluid tight seal.

In various non-limiting embodiments, the sleeve 102 can be generally tubular in shape. For example, the first inner surface 112, the second inner surface 114, and, if present, the third inner surface 116 can be substantially tubular and cylindrical. In certain non-limiting embodiments, the first inner surface 112 can comprise a first inner diameter, $\phi_1$, and the second inner surface 114 can comprise a second inner diameter, $\phi_2$. The first inner diameter, $\phi_1$, can be less than the second inner diameter, $\phi_2$. In various non-limiting embodiments, the second inner diameter, $\phi_2$, is greater than or equal to a major diameter, $\phi_3$, of the threads 126, and the first inner diameter, $\phi_1$, can be greater than the major diameter, $\phi_3$. In certain non-limiting embodiments, the second inner diameter, $\phi$, can be less than a major diameter, $\phi_3$, of the threads 126, and the first inner diameter, $\phi_1$, can be greater than the major diameter, $\phi_3$. In this way, the threads 126 can readily pass through the first sleeve end 104, facilitating assembly of the blind fastener 100, while the threads 126 can forcibly engage the second inner surface 114 to install the fastener. In various non-limiting embodiments, the major diameter, $\phi_3$, of the threads 126 can be in a range of 0.06 inch to 4 inches. As used herein, "major diameter" refers to a diameter of an imaginary co-axial cylinder that just contacts the thread crest of the threads 126.

Figure 2:
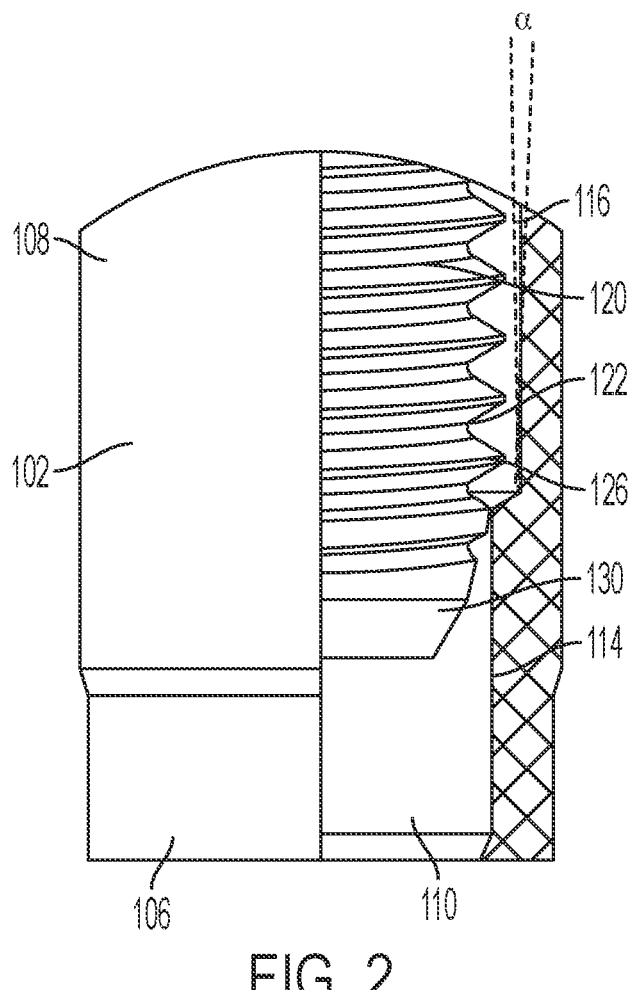
FIG. 2 is detail view of area 2 of FIG. 1.

Referring to FIG. 2, which shows the circled region 2 in FIG. 1, the second inner surface 114 can be substantially tubular and smooth. That is, the second inner surface 114 may be free of threads (e.g., no threads are formed on the second inner surface 114 during manufacture of the sleeve 102, prior to engagement with the pin 120). In certain non-limiting embodiments, the second inner surface 114 can comprise an at least partially threaded region (not shown) to facilitate alignment and/or engagement with the threads 126 of the pin 120 and a substantially smooth region (e.g., a region without threads but may contain a micro texture from a manufacturing process) that can be deformed and threaded by the threads 126 of the pin 120. The at least partially threaded region can be intermediate the substantially smooth region and the first sleeve end 104. In certain non-limiting embodiments, the pin 120 can be disposed within the cavity 110 of the sleeve 102 and the pin 120 can form an at least partially threaded region in the second inner surface 114. The forming of the at least partially threaded region can cease when the flange portion 138 of the pin 120 forcibly contacts the flange portion 118 of the sleeve 102. Thereafter, the flange portion 138 and the flange portion 118 can be machined in combination to ensure these are flush relative to one another.

A length of the engagement between the second inner surface 114 and threads 126 after installation of the blind fastener 100 can be sized to reduce weight of the blind fastener 100 while achieving desired fluid tightness and desired mechanical strength of the installed blind fastener 100. The length of engagement can be configured by sizing the second inner surface 114, the total length of the sleeve 102, the length of the threads 126, and the total length of the shank 122. In various non-limiting embodiments, the length of engagement can be no greater than 5 times the minor diameter of the threads 126, such as, for example, no greater than 4 times the minor diameter of the threads 126, no greater than 2 times the minor diameter of the threads 126, no greater than 1.1 times the minor diameter of the threads 126, or no greater than the minor diameter of the threads 126. In certain non-limiting embodiments, the length of engagement can be at least 0.5 times the minor diameter of the threads 126 or at least the minor diameter of the threads. In certain non-limiting embodiments, the length of engagement can be in a range of 0.5 to 5 times the minor diameter of the threads 126. Other engagements lengths may be desirable if, for example, two or more bulbs are formed on the sleeve 102 during installation of the blind fastener 100.

Referring again to FIG. 1, the third inner surface 116, if present, can be intermediate the first inner surface 112 and the second inner surface 114. In various non-limiting embodiments, the third inner surface 116 is a tapered inner surface and/or the sleeve 102 may have a variable wall thickness. Due to the taper of the inner surface and/or the variable wall thickness, a diameter of the sleeve cavity 110 can decrease along its length in an axial direction towards the second sleeve end 106. In certain non-limiting embodiments, referring to FIG. 2, the third inner surface 116 tapers towards the second sleeve end 106 at an angle, $\alpha$, in a range of greater than 0 degrees to 6 degrees, such as, for example, at an angle, $\alpha$, in a range of 1 degree to 6 degrees relative to the longitudinal axis, $A_1$, of the blind fastener 100 or at an angle, $\alpha$, in a range of 2 to 4 degrees relative to the longitudinal axis, $A_1$, of the blind fastener 100.

Referring again to FIG. 1, the elongate portion 108 of the sleeve 102 can be configured to deform and form a bulb or at least two bulbs responsive to the forces imparted to the sleeve 102 as the second pin end 130 forms threads on the second inner surface 114. For example, the tapered surface, variable wall thickness, or other feature can be a point of increased stress (e.g., thinnest wall thickness unsupported by the structure during installation) to initiate formation of a bulb on the sleeve 102 such that the formed bulb applies a compressive force on the structure. In certain non-limiting embodiments, the sleeve 102 can be formed with a functional strain gradient in order to form the bulb in the desired location while threads are being formed on the second inner surface 114.

The blind fastener 100 can be sized as the application requires. For example, a major diameter of the threads 126 can be in a range of 0.06 inch to 4 inches. In various non-limiting embodiments, the blind fastener 100 can comprise a size in a range of ANSI screw size 4 to 1 inch diameter. The blind fastener 100 can be configured to accommodate various thicknesses of structures. For example, the total length of the sleeve 102 can be sized such that the second sleeve end 106 extends beyond the blind side of the structure when installed in a bore in the structure. The pin 120 similarly can be sized based on the size of the sleeve 102.

Referring again to FIG. 1, the shank 122 of the pin 120 can define the longitudinal axis, $A_1$, of the pin 120 and/or the blind fastener 100. The shank 122 can be configured to engage the sleeve 102 in order to retain the shank 122 to the sleeve 102. Upon engagement between the shank 122 and the sleeve 102, the longitudinal axis, $A_1$, of the pin 120 and the longitudinal axis of the sleeve 102 can be substantially aligned along longitudinal axis, $A_1$, of the blind fastener 100.

The sleeve cavity 110 of the sleeve 102 can be configured to at least partially receive the shank 122 of the pin 120 therein. For example, the sleeve cavity 110 can comprise a shape suitable to at least partially receive the shank 122 of the pin 120. The sleeve 102, including the second inner surface 114, can be configured to be at least partially deformed responsive to forcible contact with the threads 126 of the shank 122. For example, during and/or after introduction of the shank 122 into the sleeve cavity 110, at least a portion of the second inner surface 114 can be at least partially deformed (e.g., have threads formed thereon) responsive to forcible contact with the threads 126.

Figure 3:
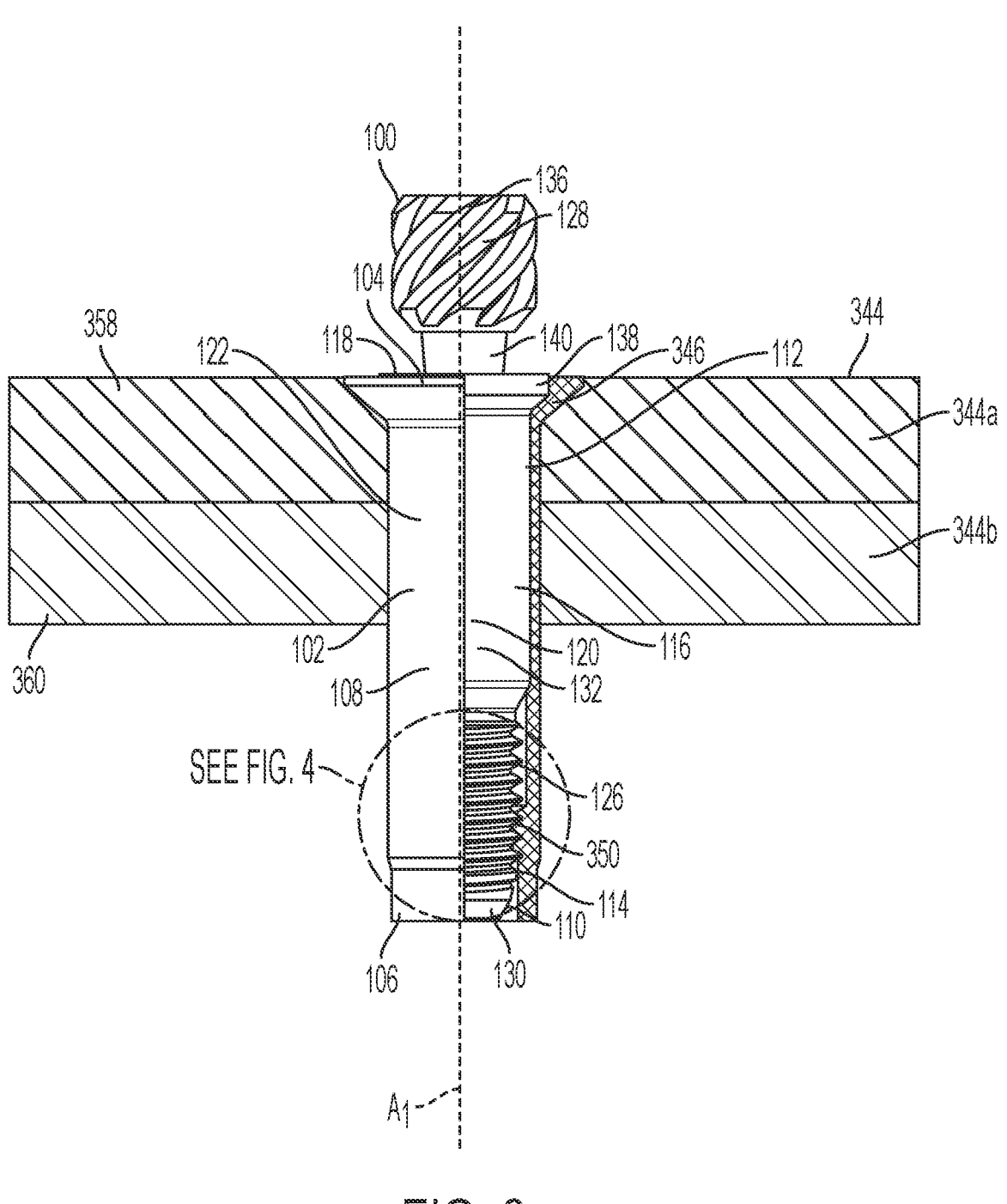
FIG. 3 is a partial cross-sectional elevational view of the blind fastener of FIG. 1, shown partially installed in a structure with at least a portion of threads formed on the second inner surface of the sleeve by threads on a pin.
Figure 5:
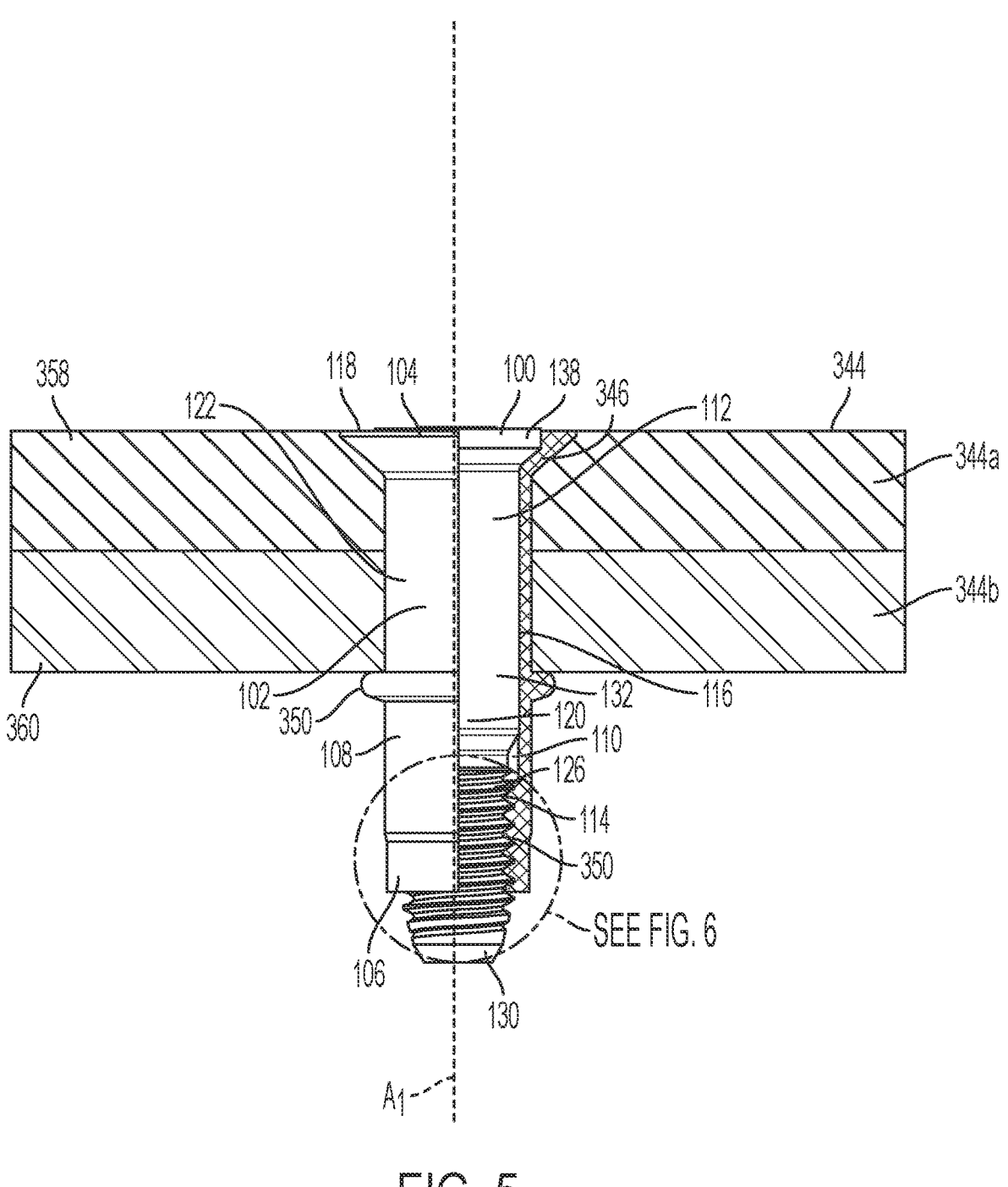
FIG. 5 is a partial cross-sectional elevational view of the blind fastener of FIG. 3, shown installed in the structure with threads formed on the second inner surface of the sleeve and a bulb formed in an elongate portion of the sleeve.

Continued deformation of the second inner surface 114 can decrease a distance between the first sleeve end 104 and the second sleeve end 106, thereby deforming the elongate portion 108 of the sleeve 102 to form a bulb thereon (as described with respect to FIGS. 3 and 5). Deformation of the elongate portion 108 can create a compressive force on a structure between the bulb and the first sleeve end 104, securing the blind fastener 100 within a bore of the structure. In various examples, continued deformation of the second inner surface 114 can tighten the formed bulb against a surface of the structure that is opposite to the flange portion 118 of the sleeve 102 to secure the bulb against the structure and develop a substantially consistent, uniform, clamping force (e.g., preload). The clamping of the bulb against the structure can provide a fluid tight seal between the blind fastener and the structure.

In various non-limiting embodiments, the pin 120 may comprise a breakneck groove 140 (e.g., a frangible section) configured to fracture to separate all or a portion of the head portion 136 from the pin 120 upon installation of the blind fastener 100 in a structure. For example, after a desired torque is achieved, the breakneck groove 140 can fracture. The desired torque can correspond to the torque desired to develop a desired installation force on the blind fastener 100. In certain other non-limiting embodiments, the pin 120 does not comprise a breakneck groove but is configured to include one or more other features so that the head portion 136 of the pin 120 fractures during installation of the blind fastener 100. In various non-limiting embodiments, the pin 120 does not comprise a breakneck groove or other feature configured to fracture upon installation of the blind fastener 100, and the head portion 136 remains intact after installation. Thus, according to various non-limiting embodiments, multi-piece fasteners according to the present disclosure may be installed in a structure without fracturing of a breakneck groove or other feature, or the fasteners may include a breakneck groove or other feature that fractures upon installation of the fastener into the structure.

Blind fastener 100 can comprise at least one of a metal, a metal alloy, a composite material, or another suitable material. For example, in various non-limiting embodiments, the blind fastener 100 can comprise at least one of aluminum, an aluminum alloy, copper, a copper alloy, titanium, a titanium alloy, nickel, a nickel alloy, iron, an iron alloy, and a carbon fiber composite material. The pin 120 can comprise a first material with a first hardness, and the sleeve 102 can comprise a second material with a second hardness. In various embodiments, the second hardness can be less than the first hardness such that the threads 126 can deform the second inner surface 114 of the sleeve 102 with minimal, if any, deformation of the threads 126. For example, in various embodiments, the sleeve 102 can comprise aluminum, an aluminum alloy, copper, or a copper alloy (e.g., brass, bronze), and the pin 120 can comprise titanium, a titanium alloy, nickel, a nickel alloy, iron, or an iron alloy (e.g., steel, stainless steel). In certain non-limiting embodiments, the pin 120 can form threads on the second inner surface 114 of the sleeve 102 simultaneously with the installation of the blind fastener into the structure, thereby creating residual compressive stresses that effectively seal the pin 120 and sleeve 102 together.

As illustrated in the non-limiting embodiments shown in FIGS. 3 and 5, the blind fastener 100 can be installed into a bore 346 of a structure 344. As illustrated, the bore 346 can extend through the structure 344 from a first side 358 (e.g., an accessible side) to a second side 360 (e.g., a blind side). The structure 344 can comprise, for example, at least one of a metal, a metal alloy, a composite material, or another suitable material. For example, in certain non-limiting embodiments, the structure 344 can comprise one or more of aluminum, an aluminum alloy, titanium, a titanium alloy, nickel, a nickel alloy, iron, an iron alloy, and a carbon fiber composite material. In various non-limiting embodiments, the structure 344 in which the blind fastener 100 is installed comprises aluminum and/or an aluminum alloy, such as, for example, 7075 aluminum alloy. In various embodiments, the structure into which a fastener according to the present disclosure can be installed can be configured as an aerospace component or structure, an automotive component or structure, a transportation component or structure, a building and construction component or structure, or another component or structure.

In certain non-limiting embodiments, the structure 344 can comprise a single layer of material or two or more layers of material. For example, as illustrated in FIGS. 3 and 5, the structure 344 can comprise a first layer 344a and a second layer 344b, which may be the same material or different materials. The first layer 344a can be positioned intermediate the second layer 344b and the head portion 136 when the blind fastener 100 is installed.

Additionally, in various non-limiting embodiments, the second sleeve end 106 can be sized and configured to facilitate alignment of the sleeve 102 with the bore 346, thereby allowing the second sleeve end 106 to readily move into and through the bore 346. In various non-limiting embodiments, the flange portion 118 can be sized and configured to inhibit the sleeve 102 from traversing into the bore 346 beyond a predetermined distance.

Figure 4:
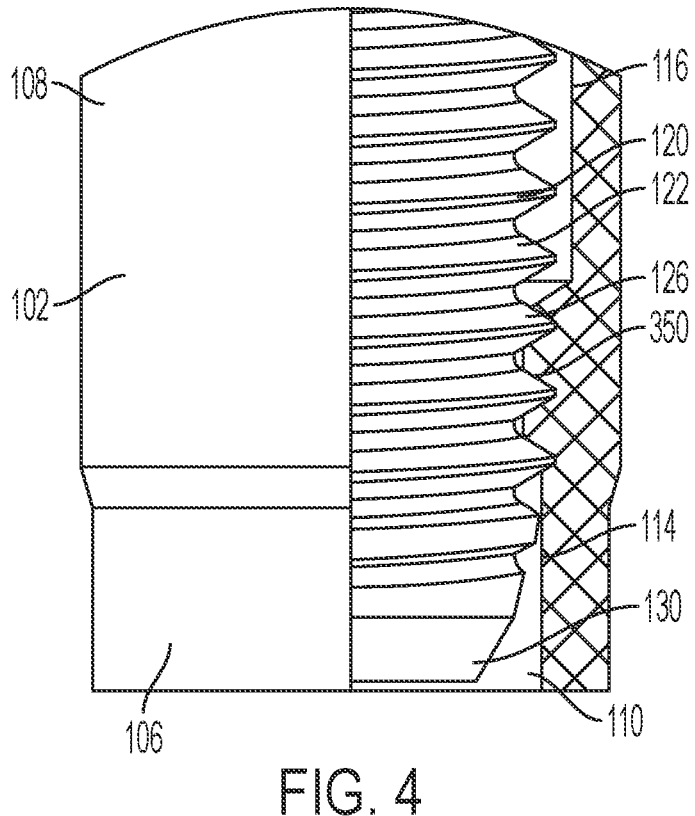
FIG. 4 is a detail view of area 4 in FIG. 3.

As understandable from FIG. 3, the second sleeve end 106 of the sleeve 102 was positioned in alignment with the first side 358 of the bore 346 and then inserted through the bore 346 such that the second sleeve end 106 extends beyond the second side 360 of the structure 344. The second pin end 130 has been inserted into the sleeve cavity 110 of the sleeve 102 and has forcibly contacted the second inner surface 114, thereby at least partially forming threads on the second inner surface 114, as shown in detail in FIG. 4. In the arrangement shown in FIG. 3 the elongate portion 108 has not yet been deformed.

With further reference to FIGS. 3 and 5, and as will be understood by those having ordinary skill in the blind fastener art, the jaws, chuck, bit, or other feature of a blind fastener installation tool can forcibly engage the head portion 136 of pin 120. Upon engagement, the blind fastener installation tool can apply an axial force to the pin 120, urging the pin 120 towards the second inner surface 114 and urging the sleeve 102 towards the structure 344. The blind fastener installation tool can also apply a rotational force about the longitudinal axis, $A_1$, to the head portion 136 of the pin 120. As the rotational force is applied, the threads 126 of the shank 122 of the pin 120 can deform the second inner surface 114, thereby forming corresponding threads 350 on the second inner surface 114. As the pin 120 moves in this way, the same or a different blind fastener installation tool can engage the sleeve 102 to inhibit the sleeve 102 from rotating about the longitudinal axis, $A_1$, as the pin 120 rotates.

Figure 8:
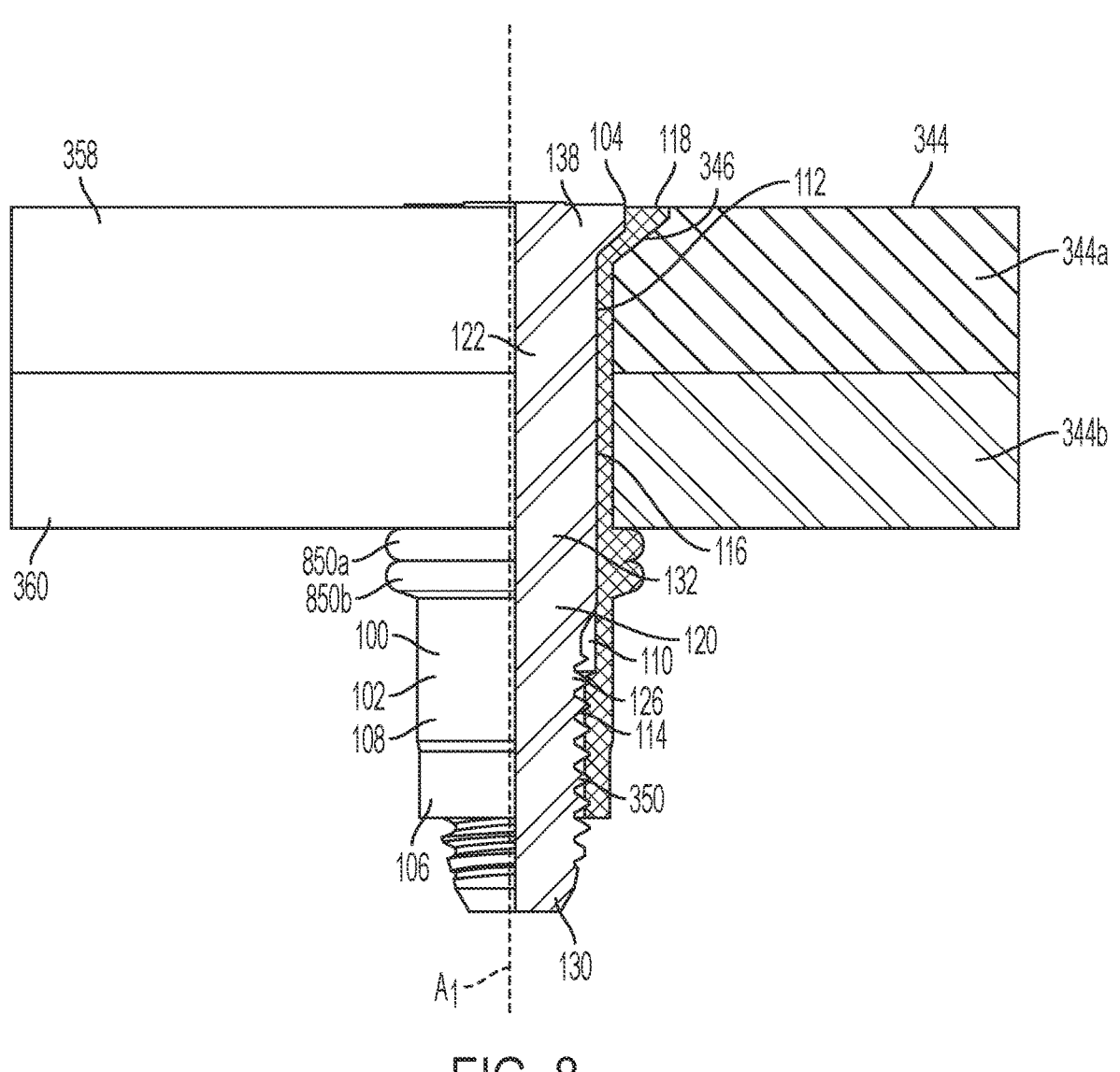
FIG. 8 is a partial cross-sectional elevational view of a non-limiting embodiment of a blind fastener according to the present disclosure, shown installed in a structure with threads formed on the second inner surface of the sleeve and two bulbs formed on the elongate portion of the sleeve.

Referring to FIG. 5, as the threads 350 are formed and the pin 120 continues to rotate, the second sleeve end 106 is urged towards the first sleeve end 104 until a sufficient force is achieved, thereby deforming the elongate portion 108 (e.g., buckling) and forming a bulb 352 on the elongate portion 108 adjacent the second side 360 of the structure 344. The deformation of the elongate portion 108 can apply a clamping force to the structure 344 with the bulb 352 and the first sleeve end 104, thereby securing the blind fastener 100 to at least a portion of the structure 344. In that way, for example, the first layer 344a and second layer 344b of the structure 344 are secured together and a first fluid tight seal (e.g., liquid tight seal, air tight seal, or a combination thereof) can be formed between the sleeve 102 and the structure 344. In various non-limiting embodiments, the elongate portion 108 can be deformed to form at least two bulbs. For example, as illustrated in FIG. 8, the elongate portion 108 has been deformed and bulb 852a and bulb 852b have formed.

Figure 6:
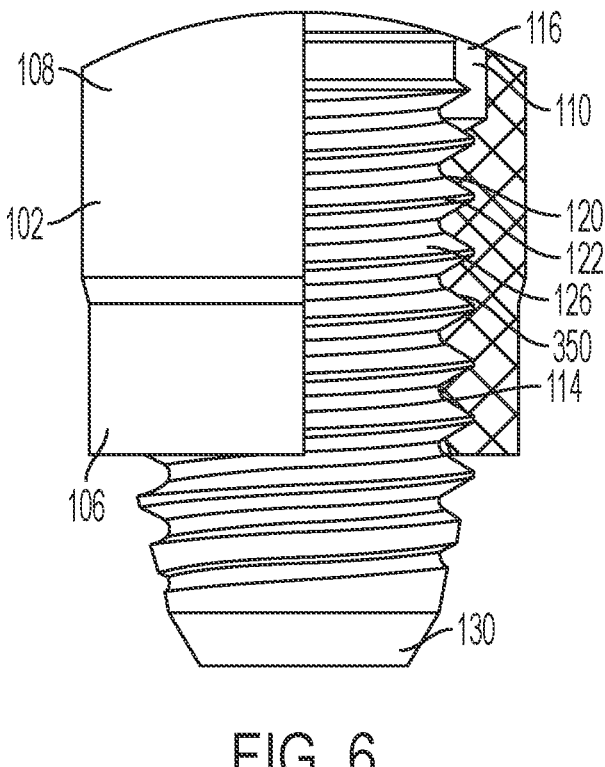
FIG. 6 is a detailed view of area 6 of FIG. 5.

In the arrangement shown in FIGS. 5 and 6, the threads 126 of the shank 122 have deformed the second inner surface 112 and formed threads 350. The threads 350 formed on the second inner surface 114 can be in geometric conformance to the threads 126 of the pin 120. The reaction force to this deformation (e.g., plastic deformation) can be a uniform pressure acting on the threads 126 of the pin 120 to form a second fluid tight seal, thereby preventing fluid from leaking through the sleeve cavity 110 of the sleeve 102. This uniform pressure can also provide resistance to vibration-induced loosening of the blind fastener 100.

Additionally, as shown in FIG. 5, any gap that may have been present between the first layer 344a and the second layer 344b of the structure 344 has been decreased and the pin 120 has fractured at the breakneck groove 140 after installation into the structure 344 as a result of the force applied to the pin 120 by the blind fastener installation tool. Alternatively, the pin 120 may not fracture (not shown) after installation into the structure 344.

The installation process as shown, for example, in FIGS. 3 and 5, can form threads 350 on the second inner surface 114 of the sleeve 102 simultaneous with the installation of the blind fastener 100 into the structure. In certain non-limiting embodiments, the threads 350 in the second inner surface 114 can be at least partially formed during assembly of the blind fastener 100, such that the pin 120 and the sleeve 102 are locked together, facilitating installation of the blind fastener 100 in the structure. Thereafter, the formation of the partially formed threads 350 can be completed simultaneous with installation of the blind fastener 100 into the structure 344. In various non-limiting embodiments, the sleeve 102 and the pin 120 are locked together by another means, or simply are not locked together, and the threads 350 are only formed during the installation process.

Embodiments of blind fasteners according to the present disclosure can be used in a method for fastening a structure. FIG. 9 illustrates steps of a non-limiting embodiment of such a method. The method illustrated in FIG. 9 can comprise inserting the second sleeve end 106 of a blind fastener 100 according to the present disclosure into a bore 346 in a structure 344 such that the second sleeve end 106 of the sleeve 102 extends beyond the second side of the structure 344 (at step 902). After inserting the second sleeve end 106 into the structure 344, the threads 126 of the pin 120 can forcibly contact the second inner surface 114 of the sleeve 102 by applying an axial force to the head portion 136 of the pin 120 and/or rotating the pin 120 by applying a rotating force to the head portion 136 of the pin 120 (at step 904). The threads 126 of the pin 120 can deform the second inner surface 114 of the sleeve 102, thereby forming threads on the second inner surface 114 (at step 906). Thereafter, the elongate portion 108 of the sleeve 102 can be deformed to form a bulb and a fluid tight seal can be formed between the pin 120 and the sleeve 102 and/or between the sleeve 102 and the structure 344 (at step 908). In certain non-limiting embodiments, the threads on the second inner surface 114 and the bulb on the elongate portion 108 of the sleeve 102 can be formed simultaneously. In various non-limiting embodiments, the head portion 136 can be removed by fracturing a breakneck groove 140 on the pin 120 (at step 910).

Various aspects of embodiments according to the present disclosure include, but are not limited to, the aspects listed in the following numbered clauses.

Clause 1. A blind fastener comprising:
  a sleeve comprising
    a first sleeve end comprising a first inner surface,
    a second sleeve end comprising a second inner surface, and
    an elongate portion extending from the first sleeve end to the second sleeve end,
    wherein the first inner surface and the second inner surface define regions of a sleeve cavity extending into the sleeve from the first sleeve end toward or to the second sleeve end; and
  a pin configured to be at least partially received by the sleeve cavity, the pin comprising
    a first pin end portion configured to receive a torque,
    a second pin end, and
    a shank extending from the first pin end portion to the second pin end, the shank comprising threads, wherein the threads are configured to form threads on the second inner surface of the sleeve.

Clause 2. The blind fastener of clause 1, wherein the first pin end portion comprises a head portion and wherein the head portion comprises at least one of a substantially flat side, a rib, a spline, an indent, a knurl, a lobe, a bore, a recessed socket, and a tab.

Clause 3. The blind fastener of any of clauses 1-2, wherein the first pin end portion comprises a flange portion configured to inhibit the pin from traversing through the sleeve cavity beyond a predetermined distance.

Clause 4. The blind fastener of any of clauses 1-3, wherein the sleeve comprises a third inner surface intermediate the first inner surface and the second inner surface, wherein the third inner surface is tapered.

Clause 5. The blind fastener of clause 4, wherein the third inner surface tapers at an angle in a range of greater than 0 degrees to 6 degrees relative to a longitudinal axis of the blind fastener.

Clause 6. The blind fastener of any of clauses 1-5, wherein a diameter of the sleeve cavity decreases along a length of the sleeve in an axial direction towards the second sleeve end.

Clause 7. The blind fastener of any of clauses 1-6, wherein an inner diameter of the second inner surface is less than an inner diameter of the first inner surface and is less than a major diameter of the threads of the shank.

Clause 8. The blind fastener of any of clauses 1-7, wherein the second inner surface is substantially tubular.

Clause 9. The blind fastener of any of clauses 1-8, wherein the second inner surface comprises an at least partially threaded region and a substantially smooth region, wherein the at least partially threaded region is intermediate the substantially smooth region and the first sleeve end.

Clause 10. The blind fastener of any of clauses 1-9, wherein the elongate portion of the sleeve is configured to deform into a bulb shape responsive to the second pin end forming threads on the second inner surface and compressing the elongate portion.

Clause 11. The blind fastener of any of clauses 1-10, wherein the pin comprises a breakneck groove intermediate the first pin end portion and the second pin end, the breakneck groove configured to fracture upon installation of the blind fastener.

Clause 12. The blind fastener of any of clauses 1-11, wherein the pin comprises a first material with a first hardness, wherein the sleeve comprises a second material with a second hardness, and wherein the second hardness is less than the first hardness.

Clause 13. The blind fastener of any of clauses 1-12, wherein a fluid tight seal is formed between the pin and the sleeve after forming threads in the second inner surface.

Clause 14. The blind fastener of any of clauses 1-13, wherein the second sleeve end is closed.

Clause 15. The blind fastener of any of clauses 1-14, wherein the first sleeve end comprises a sleeve flange portion configured to inhibit the sleeve from traversing through a bore in a structure beyond a predetermined distance.

Clause 16. The blind fastener of any of clauses 1-15, wherein the first sleeve end is configured to receive a torque.

Clause 17. The blind fastener of any of clauses 1-16, wherein the blind fastener is configured to be installed in a bore in a structure and wherein the structure is configured as at least one of an aerospace part or component, an automotive part or component, a transportation part or component, and a building and construction part or component.

Clause 18. The blind fastener of any of clauses 1-17, wherein a major diameter of the threads of the shank are in a range of 0.06 inch to 4 inches.

Clause 19. A structure comprising the blind fastener of any of clauses 1-18, wherein the structure is configured as at least one of an aerospace part or component, an automotive part or component, a transportation part or component, and a building and construction part or component.

Clause 20. A method for fastening, the method comprising:
  inserting the second sleeve end of the sleeve of the blind fastener according to any of clauses 1-18 into a bore in a structure; and
  forcibly contacting the threads of the shank of the pin with the second inner surface of the sleeve, thereby deforming the second inner surface and forming threads thereon; and
  deforming the elongate portion of the sleeve to form a bulb thereon.

Clause 21. A method for fastening, the method comprising:
  inserting a second sleeve end of a sleeve of a blind fastener into a bore in a structure, the blind fastener comprising:
  the sleeve comprising
    a first sleeve end comprising a first inner surface,
    the second sleeve end comprising a second inner surface, and
    an elongate portion extending from the first sleeve end to the second sleeve end,
    wherein the first inner surface and the second inner surface define regions of a sleeve cavity extending into the sleeve from the first sleeve end toward or to the second sleeve end, and a pin configured to be at least partially received by the sleeve cavity, the pin comprising a first pin end portion, a second pin end, and a shank extending from the first pin end portion to the second pin end, the shank comprising threads;

forcibly contacting the threads of the shank of the pin with the second inner surface of the sleeve, thereby deforming the second inner surface and forming threads thereon; and deforming the elongate portion of the sleeve to form a bulb thereon.

Clause 22. The method of clause 21, further comprising applying a rotational force to the first pin end portion to forcibly contact the threads of the shank with the second inner surface.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

One skilled in the art will recognize that the herein described blind fasteners, blind fastening systems, structures, methods, operations/actions, and objects, and the discussion accompanying them, are used as examples for the sake of conceptual clarity and that various configuration modifications are contemplated. Consequently, as used herein, the specific examples/embodiments set forth and the accompanying discussion is intended to be representative of their more general classes. In general, use of any specific exemplar is intended to be representative of its class and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A blind fastener comprising:

a sleeve comprising:

a first sleeve end comprising a first inner surface, a second sleeve end comprising a second inner surface, a third inner surface intermediate the first inner surface and the second inner surface, wherein the sleeve at the third inner surface has a variable wall thickness configured to initiate formation of a bulb on the sleeve to apply a compressive force against a structure after installation of the blind fastener and form a fluid tight seal between the blind fastener and the structure, and an elongate portion extending from the first sleeve end to the second sleeve end, wherein the first inner surface, the second inner surface, and the third inner surface define regions of a sleeve cavity extending into the sleeve from the first sleeve end toward or to the second sleeve end; and a pin configured to be at least partially received by the sleeve cavity, the pin comprising:

a first pin end portion configured to receive a torque, a second pin end, and a shank extending from the first pin end portion to the second pin end, the shank comprising threads, wherein the threads are configured to form threads on the second inner surface of the sleeve and form a fluid tight seal between the pin and the sleeve, wherein the second inner surface and the threads of the shank are configured such that, after installation of the blind fastener, a length of engagement between the second inner surface and the threads of the shank is no greater than 2 times a minor diameter of the threads of the shank, and the threads of the shank extend uninterrupted from the second pin end over at least the length of engagement.

2. The blind fastener of claim 1, wherein the first pin end portion comprises a head portion and wherein the head portion comprises at least one of a substantially flat side, a rib, a spline, an indent, a knurl, a lobe, a bore, a recessed socket, and a tab.

3. The blind fastener of claim 1, wherein the first pin end portion comprises a flange portion configured to inhibit the pin from traversing into the sleeve cavity beyond a predetermined distance.

4. The blind fastener of claim 1, wherein the third inner surface is tapered.

5. The blind fastener of claim 4, wherein the third inner surface tapers at an angle in a range of greater than 0 degrees to 6 degrees relative to a longitudinal axis of the blind fastener.

6. The blind fastener of claim 4 wherein the third inner surface is tapered at an angle in a range of 1 degree to 6 degrees.

7. The blind fastener of claim 1, wherein a diameter of the sleeve cavity decreases along a length of the sleeve in an axial direction towards the second sleeve end.

8. The blind fastener of claim 1, wherein an inner diameter of the second inner surface is less than an inner diameter of the first inner surface and less than a major diameter of the threads of the shank.

9. The blind fastener of claim 1, wherein the second inner surface comprises an at least partially threaded region and a substantially smooth region, wherein the at least partially threaded region is intermediate the substantially smooth region and the first sleeve end.

10. The blind fastener of claim 1, wherein the elongate portion of the sleeve is configured to deform into the bulb responsive to the second pin end forming threads in the second inner surface and compressing the elongate portion.

11. The blind fastener of claim 1, wherein the pin comprises a breakneck groove intermediate the first pin end portion and the second pin end, wherein the breakneck groove is configured to fracture upon installation of the blind fastener.

12. The blind fastener of claim 1, wherein the pin comprises a first material with a first hardness, wherein the sleeve comprises a second material with a second hardness, and wherein the second hardness is less than the first hardness.

13. The blind fastener of claim 1, wherein the second sleeve end is closed.

14. The blind fastener of claim 1, wherein the first sleeve end comprises a sleeve flange portion configured to inhibit the sleeve from traversing through a bore in a structure beyond a predetermined distance.

15. The blind fastener of claim 1, wherein the first sleeve end is configured to receive a torque.

16. The blind fastener of claim 1, wherein the blind fastener is a two-component blind fastener consisting of the sleeve and the pin.

17. The blind fastener of claim 1, wherein:

the first sleeve end comprises a sleeve flange portion configured to inhibit the sleeve from traversing through a bore in the structure beyond a predetermined distance;

the bulb and the sleeve flange portion are configured to contact opposite surfaces of the structure;

the blind fastener is operable from one side of the structure;

the second inner surface comprises an at least partially threaded region and a substantially smooth region; and the at least partially threaded region is intermediate the substantially smooth region and the first sleeve end.

18. The blind fastener of claim 17, wherein:

an inner diameter of the second inner surface is less than an inner diameter of the first inner surface and less than a major diameter of the threads of the shank;

the pin comprises a breakneck groove intermediate the first pin end portion and the second pin end, wherein the breakneck groove is configured to fracture upon installation of the blind fastener;

the first sleeve end is configured to receive a torque; and the first pin end portion comprises a head portion and wherein the head portion comprises at least one of a substantially flat side, a rib, a spline, an indent, a knurl, a lobe, a bore, a recessed socket, and a tab.

* * * * *